(12) United States Patent
Paquette

(10) Patent No.: US 8,063,339 B2
(45) Date of Patent: Nov. 22, 2011

(54) WELDING SYSTEM TOROIDAL SPARK GAP METHOD AND SYSTEM

(75) Inventor: J. Lawrence Paquette, Manton, MI (US)

(73) Assignee: Illinois Tool Works Inc., Glenview, IL (US)

(*) Notice: Subject to any disclaimer, the term of this patent is extended or adjusted under 35 U.S.C. 154(b) by 847 days.

(21) Appl. No.: 11/656,071

(22) Filed: Jan. 22, 2007
(Under 37 CFR 1.47)

(65) Prior Publication Data
US 2007/0251933 A1 Nov. 1, 2007

Related U.S. Application Data

(60) Provisional application No. 60/795,839, filed on Apr. 28, 2006.

(51) Int. Cl.
*B23K 9/06* (2006.01)
*B23K 9/10* (2006.01)
*B23K 9/00* (2006.01)

(52) U.S. Cl. ............. 219/130.4; 219/130.1; 219/130.51; 219/136

(58) Field of Classification Search ............... 219/130.4, 219/130.1, 130.51, 136
See application file for complete search history.

(56) References Cited

U.S. PATENT DOCUMENTS

| 2,471,263 | A |   | 5/1949  | Depew |
| 2,889,480 | A |   | 6/1959  | Soulary et al. |
| 3,564,333 | A | * | 2/1971  | Cramer et al. ................. 315/171 |
| 4,618,760 | A | * | 10/1986 | Murch et al. ............... 219/130.4 |
| 6,075,224 | A |   | 6/2000  | De Coster |
| 6,337,789 | B1 |  | 1/2002  | Achtner |
| 6,384,374 | B1 |  | 5/2002  | Colling et al. |
| 6,998,574 | B2 |  | 2/2006  | Blankenship |

* cited by examiner

*Primary Examiner* — Henry Yuen
*Assistant Examiner* — Ayub Maye
(74) *Attorney, Agent, or Firm* — Fletcher Yoder, P.C.

(57) ABSTRACT

A spark gap device is described such as for use in welding systems. The device receives a high voltage, low current input signal and produces high frequency waveform output. The device includes one or more toroidal members surrounding a rod-like member with an annular gap therebetween. When the input signal is applied to the device, arcs are established in the gap between the toroidal members and the rod-like member, producing the high frequency output. Erosion and loci of arcs between the toroidal members and the rod-like member are distributed, resulting in extended life of the assembly. The gaps are also shielded from contaminants and moisture by an insolative body that maintains the toroidal members and the rod-like member in place with respect to one another.

20 Claims, 4 Drawing Sheets

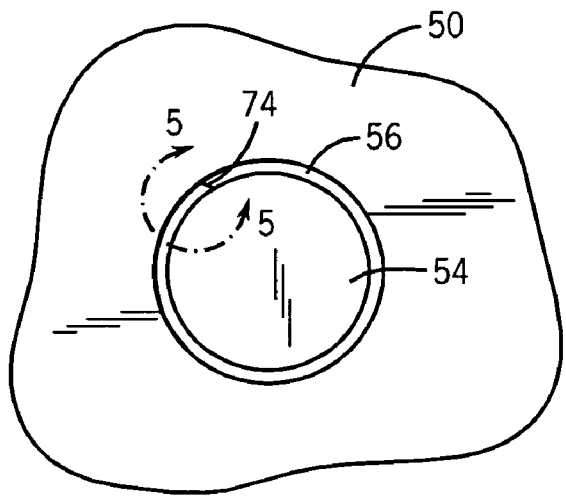
FIG. 4
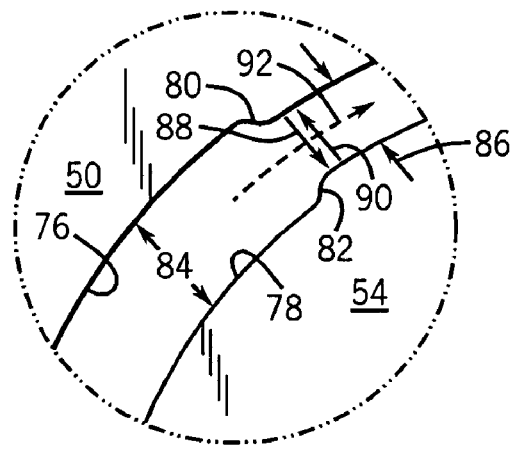
FIG. 5
FIG. 6
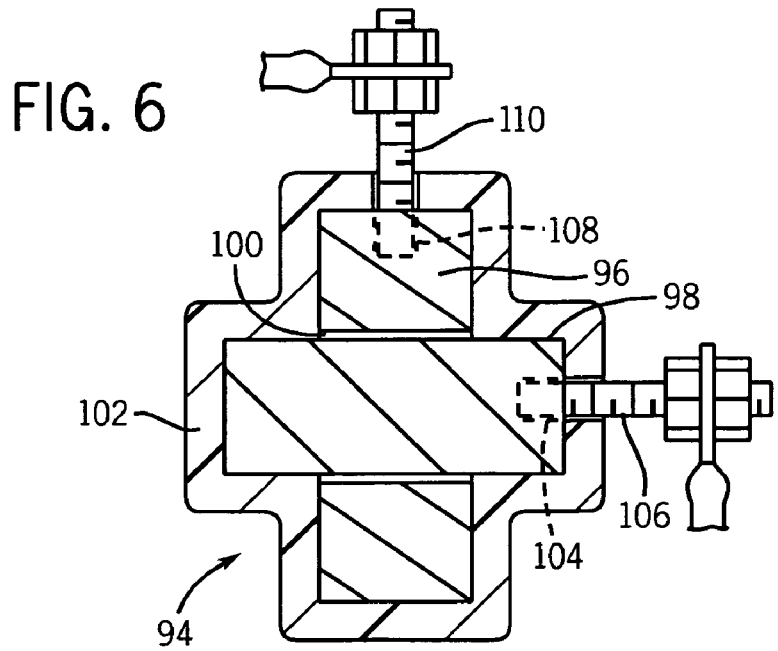

WELDING SYSTEM TOROIDAL SPARK GAP METHOD AND SYSTEM

CROSS REFERENCE TO RELATED APPLICATIONS

This application is a Non-Provisional Application of U.S. Provisional Patent Application No. 60/795,839, entitled "WELDING SYSTEM TOROIDAL SPARK GAP METHOD AND SYSTEM", filed Apr. 28, 2006, which is herein incorporated by reference.

BACKGROUND

The present invention relates generally to the field of welding systems, and more particularly to devices for creating high voltage, low current pulses used to generate and maintain arcs in such systems.

A wide range of welding techniques have been proposed and are presently in use. In general, welding of metals is performed by melting one or more base metals in a work piece, as well as an adder metal in certain applications. One particularly useful welding technique, particularly for precise or intricate welding, is tungsten inert gas (TIG) welding. In TIG systems, a metal electrode, typically made of tungsten, is provided in a torch, and is generally not consumed (i.e., added to the base metal) during welding. Electrical current is channeled through the electrode, and a flow of a shielding gas surrounds the electrode during the welding operation, generally provided by fluid conduits leading to the torch. An arc is struck between an electrode and the workpiece to melt the workpiece. Adder metal can be provided, but in general welding takes place by the fusion of the workpiece metals.

As opposed to certain other welding techniques, in TIG welding applications, it is desirable to strike and maintain an arc with little or no contact between the electrode and the workpiece, and the arc itself may be somewhat difficult to strike and maintain based upon the welding power alone. To aid in striking and maintaining the arc, then, the power supply may be designed to superimpose a high frequency, high voltage, low current waveform on a base waveform applied to the welding electrode via a welding torch. When welding with DC power, the high frequency pulse train may be provided only during start-up or loss of the arc. In AC welding, the pulse train may similarly be provided during start-up, but may also be provided continuously, where desired, so as to stabilize the arc and prevent the arc from being rectified or extinguished during polarity reversals of the AC waveform. The systems may sense whether an arc is established or maintained in order to provide closed loop control of the application of the high frequency waveform accordingly.

High frequency waveforms for establishing and maintaining arcs in TIG welding systems have typically been provided by a spark gap assembly that produces a high frequency waveform output when a relatively high voltage, low current input power level is applied to them. Conventional spark gap assemblies typically include "points" or flat surfaces between which arcs are established and extinguished at high frequencies. Conventional spark gap assemblies typically provide for some degree of adjustment of a gap between the points to sufficiently control the output frequency, and to reduce heating of the spark gap assemblies. Various more or less complex structures have been devised for mounting the points, for regulating the distance between the points, and for applying input power to the points and drawing output waveforms from them. Many such arrangements allow for a series of spark gaps to be provided, such as between opposing faces of multiple conductive elements that form the points.

While these assemblies generally function adequately, they are not without drawbacks. For example, traditional spark cap assemblies in welding systems are open to the atmosphere. Their performance and even their life can therefore be affected by the presence of humidity and airborne contaminants. Such contaminants may be quite common in the areas in which the welding systems are called upon to operate, and tend to accumulate on the spark gap assembly structures, particularly on the points themselves. Over time, the points are thus degraded, or even cease to function reliably to initiate and stabilize arcs. Similarly, it has been found that the points of traditional spark gap assemblies may be eroded or degraded over time due to the arcing that takes place in the normal production of the high frequency waveform. Such degradation, too, ultimately leads to the need to replace the entire spark gap assembly or the points, or to perform time-consuming manual adjustments of the gap between the points.

There is a need, therefore, for improved spark gap structures and techniques that avoid the drawbacks of the prior art.

BRIEF DESCRIPTION

The invention provides a novel spark gap device designed to respond to such needs. The device may be used in a wide range of settings, including in various TIG welding systems. The spark gap assembly of the invention is designed to replace spark gap assemblies used in conventional systems, with little or no change to the other components of the systems, making it ideal for integration into existing system designs, or even retrofitting of existing spark gap assemblies.

The spark gap assembly of the invention includes a toroidal member surrounding a rod-like member. An annular gap is formed between an inner surface of the toroidal member and an outer surface of the rod-like member. An input signal is applied to either the toroidal member or to the rod-like member, and a high frequency output signal is drawn from the opposite member. The input signal may be substantially identical to input signals applied to conventional spark gap assemblies, such as a high voltage, low current AC or DC power signal. An arc is developed in the gap between the toroidal member and the rod-like member, and is established and extinguished at a high frequency, resulting in a high frequency output waveform.

The spark gap assembly of the invention may conveniently include multiple toroidal members surrounding a rod-like member. In one embodiment, the assembly includes two toroidal members that surround a rod-like member with a gap between inner surfaces of each toroidal member and the outer surface of the rod-like member. An input signal is then applied to one of the toroidal members, and the high frequency output waveform is drawn from the other of the toroidal members. In this embodiment, arcs are established between each of the toroidal members and the rod-like member, with current being conducted by the rod-like member between the toroidal members.

DRAWINGS

These and other features, aspects, and advantages of the present invention will become better understood when the following detailed description is read with reference to the accompanying drawings in which like characters represent like parts throughout the drawings, wherein:

FIG. 4 is a detailed view of an end of the a toroidal member and a rod-like member of the device of FIGS. 2 and 3 illustrating a location of an arc between these elements across a gap;

FIG. 5 is a detailed view of the arrangement shown in FIG. 4 illustrating precession of arcs around the annular gap due to erosion of the surfaces during use;

FIG. 6 is a sectional view similar to that of FIG. 3 illustrating a variant of the spark gap device in accordance with the invention including a single toroidal member;

DETAILED DESCRIPTION

Figure 1:
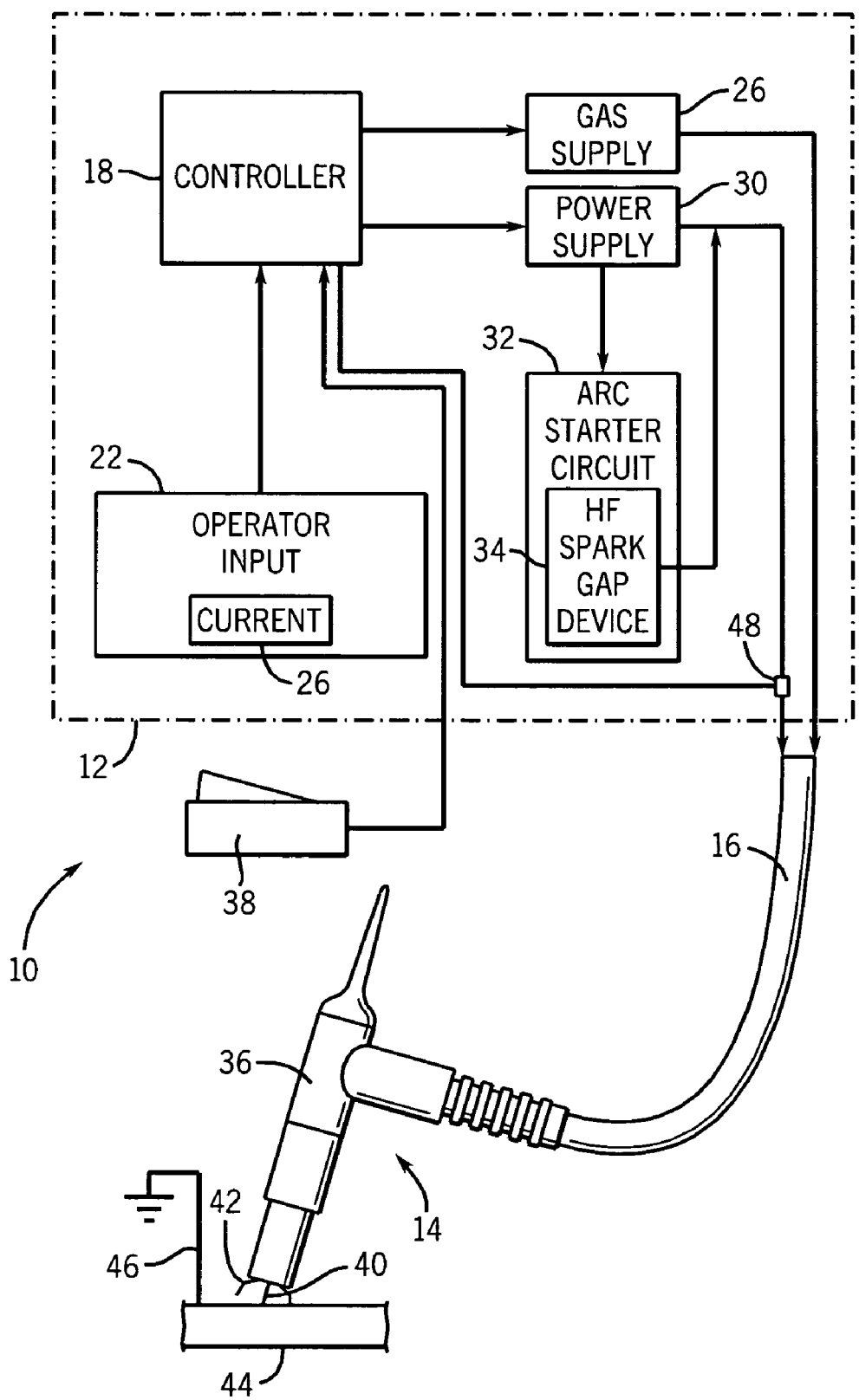
FIG. 1 is a diagrammatical representation of an exemplary TIG welding system employing a spark gap device in accordance with aspects of the present invention.

Turning now to the drawings, and referring first to FIG. 1, an exemplary welding system 10 is illustrated that makes use of a spark gap device in accordance with the invention. As noted above, it should be borne in mind that a range of different types of welding systems may be used and may benefit from the high frequency spark gap device of the invention, although the invention is particularly suited to use in TIG welding systems.

The exemplary TIG welding system 10 of FIG. 1 includes a base unit 12 that supplies welding resources to a welding torch 14 via a welding cable 16. As illustrated, the base unit 12, which may typically be enclosed as a single unit in a stationary or portable cabinet, includes a controller 18 that regulates operation of the various subsystems. The controller 18 may include any suitable control circuitry, and will typically be based upon a general purpose or application-specific microprocessor or microcontroller, programmable logic controller (PLC), or other programmed control circuitry. Although not represented, the controller is, of course, supported by ancillary devices and circuitry, such as power supplies, memory circuitry, signal conditioning circuitry, and so forth.

The controller 18 receives operator inputs 22 for controlling operation of the welding system and delivery of the welding resources as described below. In particular, in the illustrated embodiment, a current input 20 is provided for regulating the current applied to the electrode during welding. As will be appreciated by those skilled in the art, many other arrangements may be envisaged for providing other control inputs. The arrangement of FIG. 1 is intended to be exemplary only in this regard. For example, such inputs may be provided to regulate appropriate programming used to control the welding process under the control of controller 18. Where operator inputs are used, these may be provided by digital devices, analog circuits (e.g., dials with associated potentiometers), and so forth. Moreover, other inputs may include, for example, inputs for selecting whether a gas is to be applied to the weld, and whether the waveform applied to the welding torch is to be an AC or DC waveform. Moreover, as discussed below, inputs may be made on appropriate systems for controlling whether the high frequency spark gap device described below is activated during initial establishment of arcs, or continuously during operation (e.g., for arc stabilization in AC welding applications).

Based upon the operator or other inputs provided to the controller, controller 18 regulates a gas supply 26, and a power supply 30. Where such welding resources are provided, the gas supply 26 will provide a regulated flow of a shielding gas via the welding cable 16 to the welding torch. Typically welding gasses may include inert gasses, such as argon. Other shielding fluids may also be used, however. In general, the system may or may not include such a gas supply, depending upon the nature of the welding technique.

The power supply 30 draws input power from a power grid or from another source of power, such as an engine-driven generator in mobile or portable welding applications. The power supply will typically rectify an input AC waveform to generate a DC voltage. The power supply may then invert or otherwise convert the DC power to AC power when AC waveforms are selected for welding. Alternatively, DC output signals may be provided by the power supply for DC welding.

The welding system illustrated in FIG. 1 also includes an arc starter circuit 32 coupled to the power supply 30. The arc starter circuit 32 is generally designed to receive power from the power supply at a high voltage, low current level and to apply these input signals to a high frequency spark gap device 34 described in greater detail below. The spark gap device 34 outputs a high frequency pulsed waveform that is superimposed on the output of the power supply 30. As noted above, this waveform may be applied during initiation of an arc, for arc stabilization, continuously throughout welding, or in any other desired manner.

The welding resources, and in the illustrated embodiment the shielding gas and the electrical power for welding are then delivered to the welding cable 16. The welding cable will be coupled to the welding torch 14 that includes a handle 36. A switch, typically in the form of a foot pedal 38 can be activated (e.g., depressed) by a welder for initiation of the welding process. In a present embodiment, a signal is delivered from the foot pedal 38 to the controller 18 when the foot pedal switch is activated, thereby signaling the controller to initiate the delivery shielding gas and power to the welding torch. In a typical gas-shielded TIG welding application, the delivery of these resources causes shielding gas 42 to be fed from the welding gun to surround the torch electrode 40. When the electrode approaches a workpiece 44, an arc is established between the electrode and the workpiece causing melting of the workpiece under the control of the welder. The electrical circuit is closed by returning current to the base unit 12 or generally to ground as represented by reference numeral 46 in FIG. 1.

In certain applications, one or more sensors, represented generally by reference numeral 48, may be provided for detecting parameters of the power applied to the welding torch. As will be appreciated by those skilled in the art, as arcs are initiated and during welding, as well as when arcs are extinguished, voltage and current levels of the applied power may change, indicating whether the arc exists and is stable. Feedback from such sensors, then, may be used by the controller for closed-loop regulation of operation of the spark gap device, effectively superimposing the high frequency waveform from the device on the applied power at periods during welding when the arc is in need of initiation or stabilization.

Figure 7:
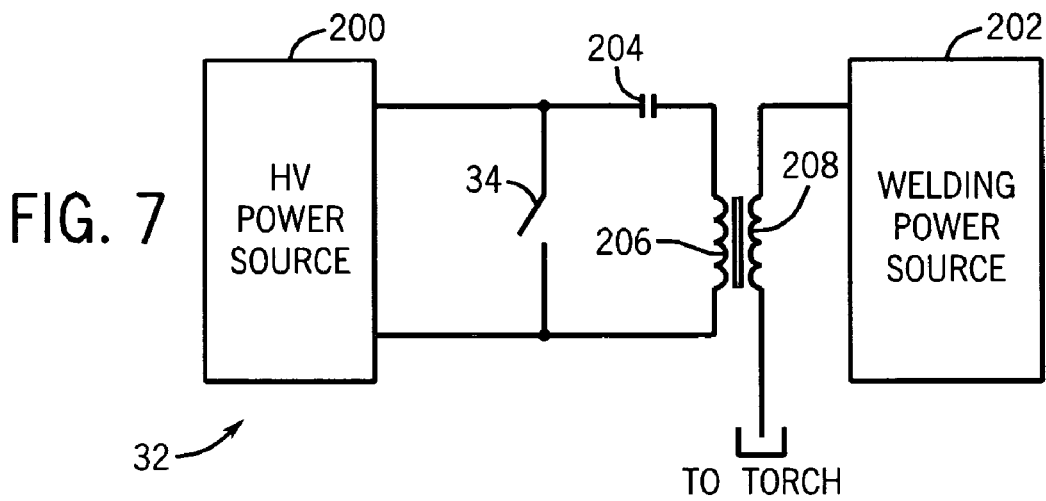
FIG. 7 is a diagrammatical view of an equivalent circuit for a high frequency power source for use in a TIG welding system incorporating the spark gap device of the invention.

FIG. 7 illustrates an exemplary equivalent circuit in which the spark gap device of the present invention could be applied. As illustrated in FIG. 7, the arc starter circuit 32 may include a high voltage power source 200 designed to cooperate with a welding power source 202. The high voltage power source 200 is coupled to a capacitor 204 in series with an inductor 206. The high frequency spark gap device 34 effectively forms a switch that can short circuit the high voltage power source. The inductor 206 forms the primary winding of a transformer that includes a secondary winding 208 designed to receive the welding power signal from the welding power source 202. The welding power source 202 may output an AC or DC welding signal as discussed above. The combination of inductors 206 and 208 effectively serves to superimpose the high-frequency signal that will be induced on the inductor 206 on the signal already present on the winding 208, thereby applying high voltage spikes at a high frequency to the welding torch for establishing or maintaining arcs or both.

Figure 8:
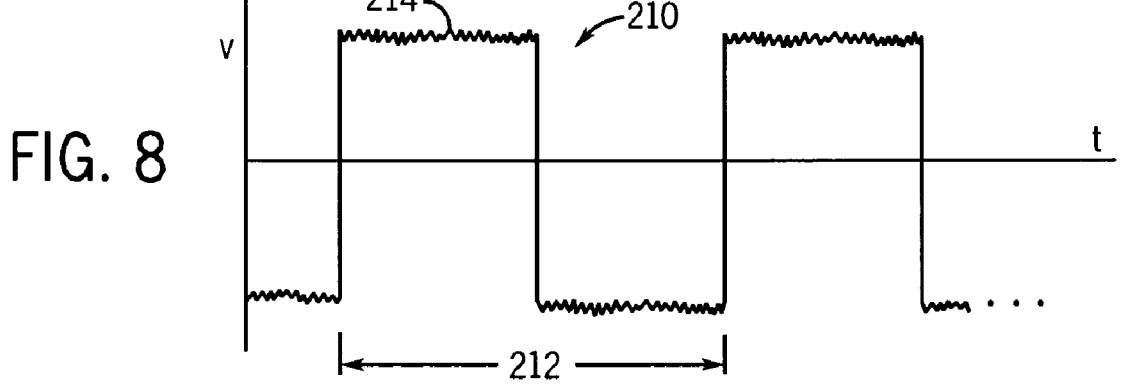
FIG. 8 is an exemplary AC waveform resulting from superposition of the high frequency output of the circuit of FIG. 7 on a welding power signal.

The signal produced by the combination of these waveforms may be of the type illustrated generally in FIG. 8. FIG. 8 illustrates a high voltage, high frequency waveform superimposed on an AC waveform for welding. In particular, FIG. 8 illustrates voltages that would be seen if measured across the spark gap device described below. The combined waveform 210 will have a voltage that varies in polarity as a function of the AC waveform on which the high frequency waveform is superimposed. The wavelength 212 illustrated in FIG. 8, for example, may correspond to a 60 Hz AC signal. The high frequency signal may appear, in FIG. 8, as a noisy voltage level as indicated generally at reference numeral 214 in FIG. 8.

Figure 9:
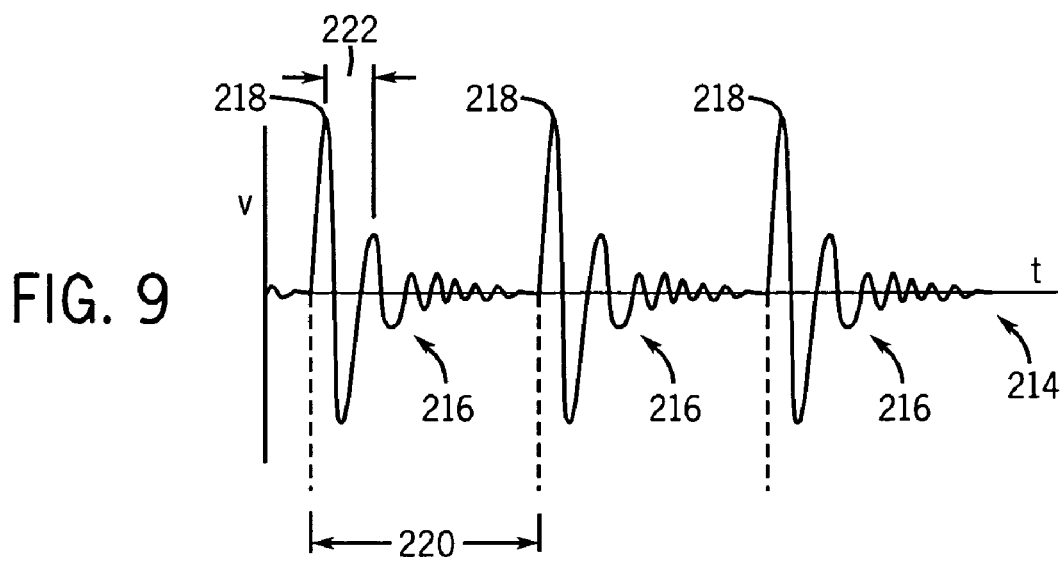
FIG. 9 is a more detailed view of a portion of the waveform of FIG. 8 illustrating how the arcing of the spark gap device produces repetitive high voltage peaks that aid in establishing and maintaining arcs.

FIG. 9 illustrates the particular waveforms that make up this portion of the complete waveform of FIG. 8. That is, FIG. 9 represents the waveform that would be seen following superposition of the high frequency signal on the welding power applied to the workpiece. In reality, what would appear as a noisy portion 214 of the waveform is composed of a series of resonant rings 216. Each ring 216 reaches an initial peak 218, followed by a series of peaks, the magnitude of which decays exponentially over the period 220 between rings. The wavelength or period 222 of these rings is determined by the configuration (i.e., ratings) of the capacitor 204 and the inductor 206 illustrated in FIG. 7, and particularly upon their relationship to one another, as will be readily appreciated by those skilled in the art. Each ring will typically have a frequency of 1-2 MHz. The timing for each of the resonant rings is determined by the opening and closing of the equivalent switch 34 illustrated in FIG. 7, in practice the establishment and interruption of arcs in the spark gap device. Each time an arc is established in the spark gap device, then, current flows through the equivalent switch 34 of FIG. 7, and interruption of this current will cause a resonant ring as illustrated in FIG. 9. While various frequencies may be used in practice, the period 220 illustrated in FIG. 9, that is, the spacing between the successive resonant rings, may be such as to provide a frequency on the order of 2.5 kHz (i.e., rings per second). Thus, the spark gap device establishes its own arcing frequency by virtue of the signal applied to it, to produce resonant rings of much higher frequency due to the inductive-capacitive network of the circuitry.

Figure 2:
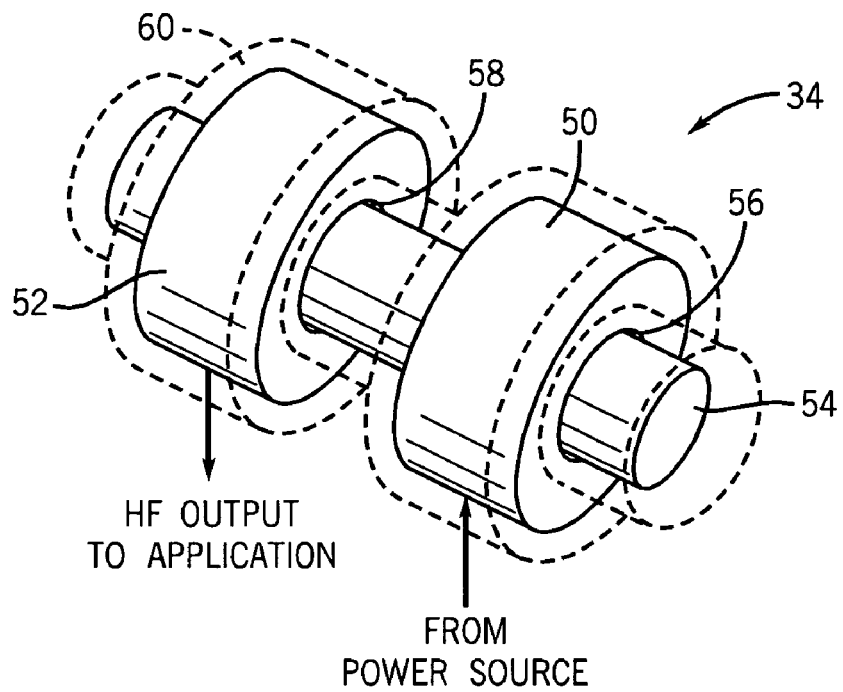
FIG. 2 is a perspective view of an exemplary spark gap device in accordance with the invention made up of a pair of toroidal members surrounding a rod-like member and with details of the assembly eliminated for the sake of clarity.

A high frequency spark gap device 34 is illustrated, in accordance with an exemplary embodiment, in FIG. 2. In the simplified diagram of FIG. 2, the device includes a pair of toroidal members generally labeled as an input toroidal member 50 and an output toroidal member 52. These two toroidal members surround a rod-like member 54. Each toroidal member includes a central opening that is spaced from the rod-like member by a gap, labeled 56 and 58 in FIG. 2. An insulative body 60 surrounds the assembly and maintains the disposition of the toroidal members and rod-like members with respect to one another in the assembly, including the spacing from one another to define the gaps 56 and 58.

Figure 3:
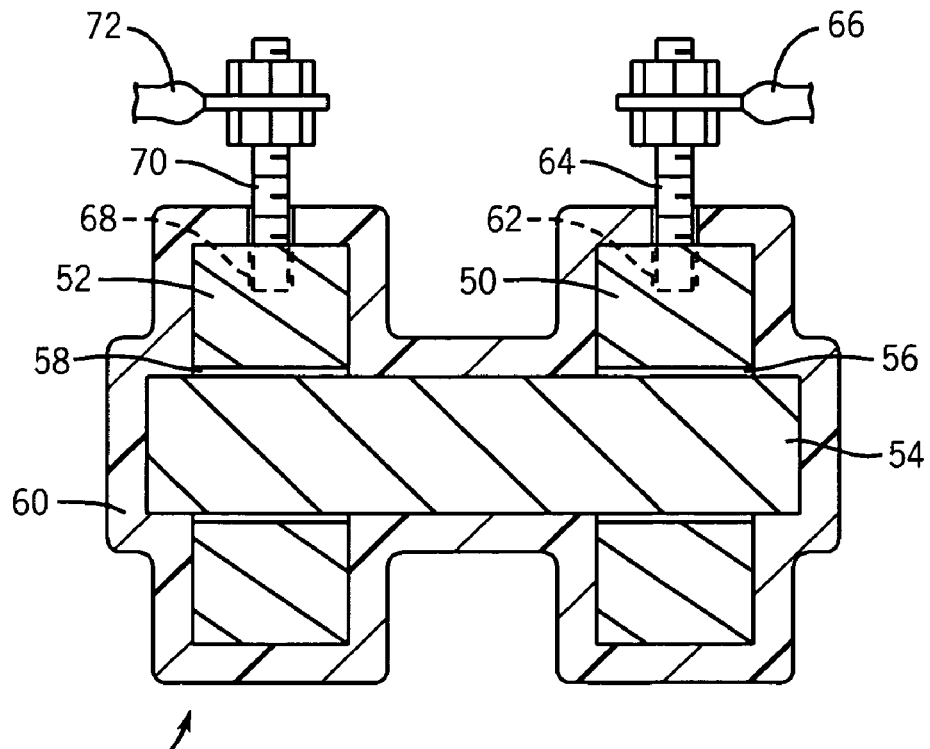
FIG. 3 is a sectional view of an exemplary spark gap device of the type shown in FIG. 2 illustrating the various components of the device along with an exemplary terminating arrangement for providing input signals and extracting output waveforms from the device.

A somewhat more detailed sectional view of the assembly is illustrated in FIG. 3. As shown in FIG. 3, each of the toroidal members 50 and 52 generally surrounds a portion of the rod-like member 54. However, gaps 56 and 58 are defined as annular spaces between the inner surface of each toroidal member and the outer surface of the rod-like member. During operation, input power is provided to one of the toroidal members, such as member 50, and the high voltage of the input power causes arcing in the gap between the member 50 and the rod-like member 54. Current is then conducted along or through the rod-like member 54 to cause similar arcing between the rod-like member 54 and the output toroidal member 52. As will be appreciated by those skilled in the art, the surface area between the toroidal members and the rod-like member, the gap spacing between these elements, and other dimensional factors of the assembly will typically depend upon such variables as the mechanical and electromagnetic properties of the materials used to form these members, the voltage applied in use, the frequency desired for the output signal, and so forth.

In a presently contemplated embodiment, gaps 56 and 58 are essentially shielded from the outside air by the insulative body 60. These gaps may contain air, partial or high vacuums, or any controlled content gas, such as inert gasses. As will be recognized by those skilled in the art, the gaps themselves thus benefit from isolation from surrounding contaminants and moisture. In a presently contemplated embodiment, the toroidal members and the rod-like member are made of a conductive material such as copper, although other materials may be employed. The insulative body may be made, for example, of a thermoset or engineering plastic, such as a plastic available under the commercial designation Rynite, which is a commercial designation of a polyethylene terephthalate (PET), available from E.I. Dupont de Nemours Co. of Wilmington, Del. Other materials for the toroidal members and rod-like member, as well as for the insulative body may, of course, be envisaged. Moreover, in a presently contemplated embodiment, a gap between the toroidal members and the rod-like member on the order of 0.010-0.015 inches is provided. The overall length of the insulative body from tip-to-tip is presently contemplated to be approximately 3 inches. In a presently contemplated embodiment, the insulative body may be made of two parts that can be fitted or snapped together to capture the toroidal members and the rod-like member therein. Alternatively, the body could be configured as a clam-shell type arrangement of a single piece that could be closed over the internal elements. It may also be envisaged to overmold the body, such as in a closed die or set of dies in which the internal elements are placed.

In a typical application, the spark gap device will be mounted by means of any suitable holder or clip-like mounting structure. The mounting structure may be provided on an interior surface of an enclosure, as in conventional welding systems. Where desired, the mounting structure may be insulative in nature to avoid arcing between either the input signal conductors or the output signal conductors, or both.

FIG. 3 also illustrates a presently contemplated technique for providing the input signals to the spark gap device and for extracting high frequency output signals from the device. As shown in FIG. 3, an aperture is provided through the insulative body adjacent to a tapped hole 62 in the input toroidal member 50. A threaded input terminal 64 is lodged within the tapped hole, and a ring terminal of an input cable 66 is secured to the input terminal 64, such as by means of lock nuts. Similar structures are provided for extracting the high frequency output signal from the assembly. As shown in FIG. 3, this includes a tapped hole 68 in the output toroidal member 52. A threaded output terminal 70 is lodged within the tapped hole, extending through an opening in the insulative body 60. In output ring terminal 72, then, draws the high frequency output signal from the assembly and is held on the output terminal 70 by means of lock nuts, for example. Other terminal techniques and structures may, of course, be provided.

In use, a driving voltage, such as a voltage on the order of 4000 VAC is provided to the input terminal, causing a high frequency waveform to be provided at the output terminal by virtue of the establishment of arcs between each of the toroidal members and the rod-like member. This output signal may then be superimposed on power signals applied to the welding torch to initiate or stabilize arcs in a generally conventional manner.

It is believed that the toroidal structures, and particularly the annular gap established between the toroidal members and the rod-like member enhance the life and reliability of the spark gap assembly of the invention. FIG. 4 illustrates a partial end view of the rod-like member 54 and one of the toroidal members, in this case the input toroidal member 50. As shown, due to the potential difference between these components, an arc 74 will be established that extends across the gap 56. A more detailed view of the arc path, and changes to the arc path over time is illustrated in FIG. 5.

As shown in FIG. 5, the inner surface 76 of the toroidal member, in this case member 50, is spaced from the outer surface 78 of the rod-like member by the annular gap described above. The arcs that are established between these surfaces will initiate at one surface and propagate to the opposite surface depending upon the polarity of the waveform applied at that moment to the assembly (assuming an AC waveform is applied that changes polarity). When an AC waveform is applied, the surface at which the arc initiates and the surface to which it extends will alternate as the polarity of the AC waveform reverses, as illustrated by the arrows in FIG. 5.

It is believed that the heating of the surfaces of the toroidal member and the rod-like member causes vaporization and eventual eroding of the surfaces as indicated generally at reference numerals 80 and 82. It should be noted that the degree of eroding is somewhat exaggerated in FIG. 5 for exemplary purposes. Due to such eroding, the gap between the inner surface 76 of the toroidal member and the outer surface 78 of the rod-like member will expand over time, as indicated by reference numeral 84, as compared to an initial or earlier gap distance labeled 86 in FIG. 5. Due to the progressive eroding of the surfaces, then, arcs originating and extending to these two surfaces, indicated generally by arrows 88 and 90 in FIG. 5, will tend to locate themselves at points of least resistance, that is, the narrower gap between the toroidal member and the rod-like member. While to some degree unpredictable, and depending upon the surface conditions of these components, it is believed that such localization of the arcs, and thus of the erosion of these members will be distributed and may process as indicated generally by arrow 92 in FIG. 5. Even if such precession is not strictly progressive as illustrated in FIG. 5, those skilled in the art will recognize that the protected gap between the toroidal members and the rod-like member will effectively distribute the loci of the arcs such that any erosion or degradation will be distributed, over time, at different locations, ultimately leading to increased life and reliability of the assembly.

Various alternative configurations may be envisaged based upon the structure and operation outlined above. For example, FIG. 6 illustrates an alternative device 94 in which a single toroidal member 96 is positioned about a rod-like member 98. Either member may serve, in this embodiment, as an input or output member. The remainder of the structure is essentially similar to that described above, with an annular gap 100 being provided between the single toroidal member 96 and the rod-like member 98, and with an insulative body 102 surrounding this structure and maintaining the toroidal member 96 and a rod-like member 98 in place. Similar to the structures described above, the alternative of single-toroidal arrangement of FIG. 6 includes a tapped hole 104 in the rod-like member in which a terminal bolt 106 is lodged. Similarly, a tapped hole 108 is provided in the toroidal member 96 in which a similar output terminal 110 is lodged.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A spark gap assembly for a welding system comprising:
   an insulative body;
   a rod-like member disposed in the insulative body;
   an input toroidal member disposed in the insulative body and surrounding the rod-like member to define a first annular gap therebetween, and
   an output toroidal member disposed in the insulative body and surrounding the rod-like member to define a second annular gap therebetween;
   wherein when an input signal is applied to the input toroidal member, high frequency arcing occurs across the first and second annular gaps to produce a high frequency pulsed output signal at the output toroidal member.

2. The assembly of claim 1, wherein the toroidal members and the rod-like member are made of a similar conductive material.

3. The assembly of claim 1, wherein the toroidal members and the rod-like members are made of copper.

4. The assembly of claim 1, wherein the annular gaps are filled with gas.

5. The assembly of claim 1, wherein the annular gaps are from approximately 0.010 to approximately 0.015 inches across.

6. The assembly of claim 1, wherein the insulative body substantially isolates the annular gaps from environmental air surrounding the assembly.

7. The assembly of claim 1, further comprising terminal assemblies for applying the input signal to the input toroidal member and for extracting the output signal from the output toroidal member.

8. The assembly of claim 1, wherein the insulative body retains the toroidal members and the rod-like member in desired positions in the assembly.

9. A spark gap assembly for a welding system comprising:
   an insulative body;
   a rod-like member disposed in the insulative body;
   at least one toroidal member disposed in the insulative body and surrounding the rod-like member to define an annular gap therebetween, wherein when a potential difference is applied between the rod-like member and the at least one toroidal member high frequency arcing occurs across the annular gap to produce a high frequency pulsed output signal.

10. The assembly of claim 9, wherein the at least one toroidal member and the rod-like member are made of a similar conductive material.

11. The assembly of claim 9, wherein the annular gap is filled with gas.

12. The assembly of claim 9, wherein the annular gap is from approximately 0.010 to approximately 0.015 inches across.

13. The assembly of claim 9, wherein the insulative body substantially isolates the annular gaps from environmental air surrounding the assembly.

14. A welding system incorporating a spark gap assembly and comprising:
    a power supply for applying electrical power to a welding gun for a welding operation; and
    a spark gap assembly including an insulative body, a rod-like member disposed in the insulative body, and at least one toroidal member disposed in the insulative body and surrounding the rod-like member to define an annular gap therebetween wherein when a potential difference is applied between the rod-like member and the at least one toroidal member high frequency arcing occurs across the annular gap to produce a high frequency pulsed output signal; and
    a controller for controlling superposition of the high frequency pulsed output signal on the electrical power applied to the welding gun.

15. The system of claim 14, wherein the electrical power applied to the welding gun is DC power, and the controller superposes the high frequency pulsed output signal for initiation of arcs between a welding electrode and a workpiece.

16. The system of claim 14, wherein the electrical power applied to the welding gun is AC power, and the controller superposes the high frequency pulsed output signal for stabilization of arcs between the welding electrode and a workpiece.

17. A method for operating a spark gap assembly comprising:
    applying an input signal to an input toroid of the spark gap assembly;
    producing arcs between the input toroid and a rod-like member disposed within an opening of the input toroid with a gap therebetween;
    conducting current in the rod-like member;
    producing arcs between the rod-like member and an output toroid disposed about the rod-like member with a gap therebetween to produce a high frequency output signal at the output toroid.

18. The method of claim 17, comprising superimposing the high frequency output signal on electrical power applied to a welding torch.

19. The method of claim 17, comprising eroding inner surfaces of the input and output toroids and an outer surface of the rod-like member by arcs therebetween.

20. The method of claim 19, comprising precessing loci of erosion on the inner surfaces of the input and output toroids and on the outer surface of the rod-like member to change points of initiation and termination of arcs therebetween over time.

* * * * *